United States Patent Office 2,777,529
Patented Jan. 15, 1957

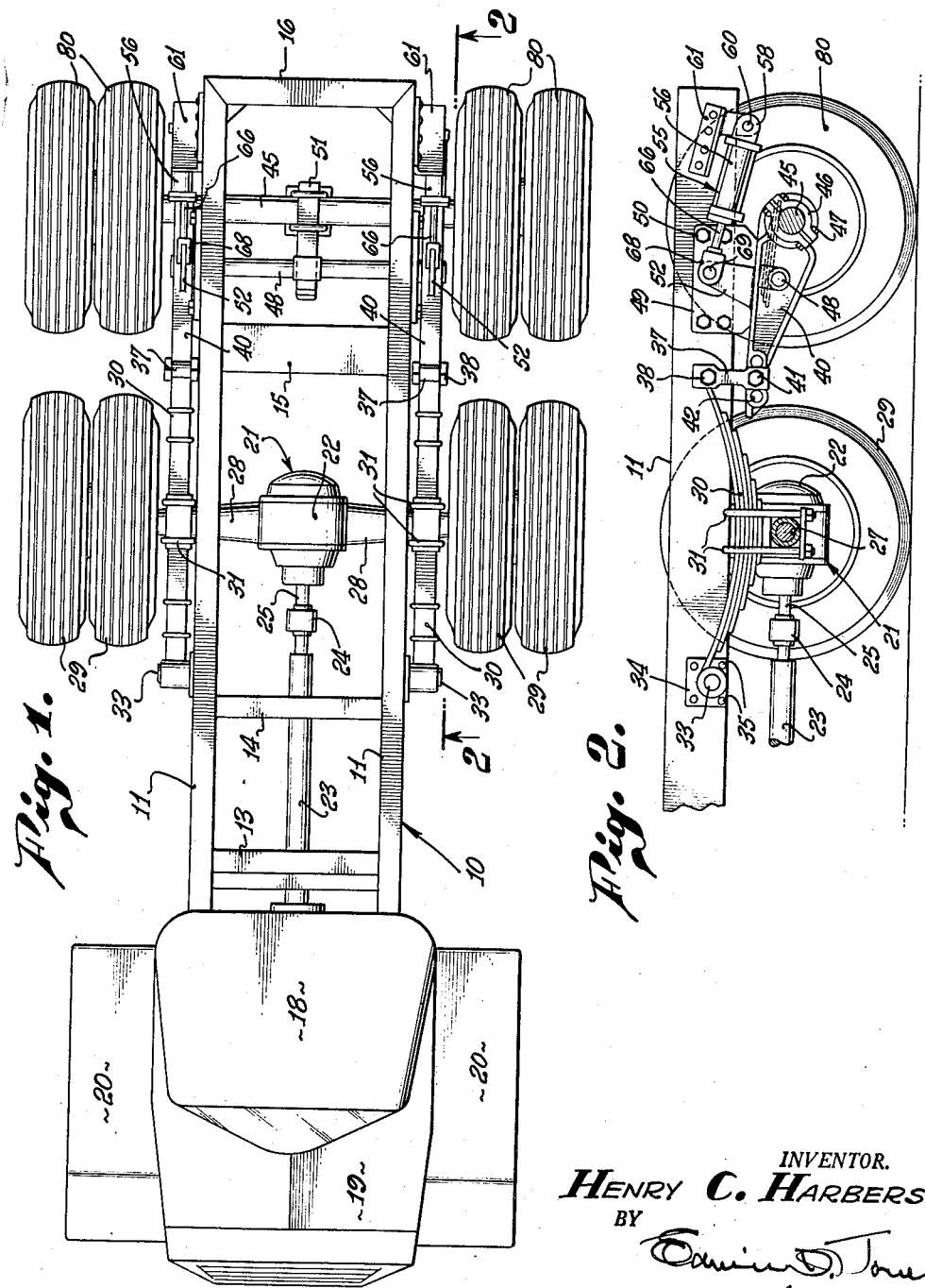

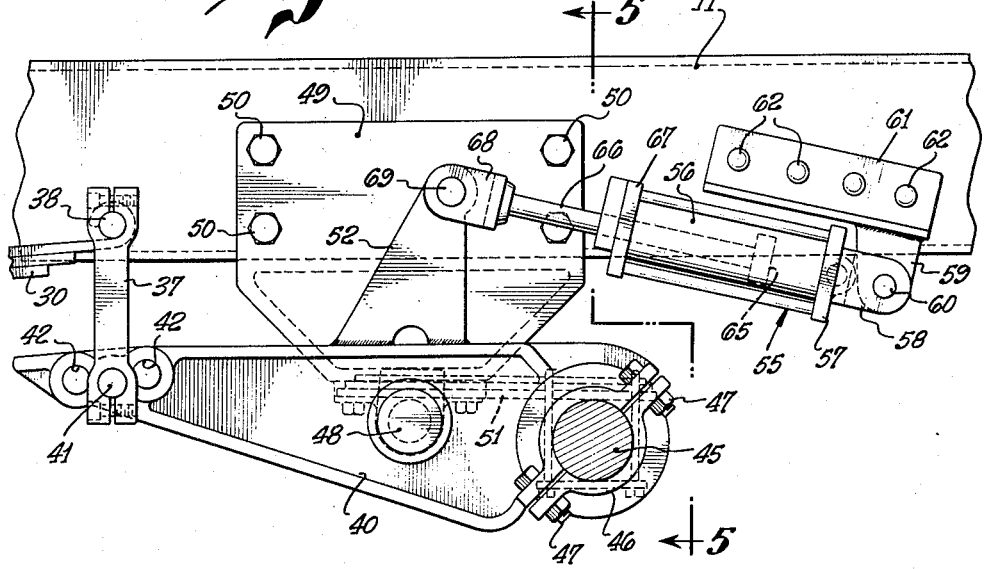
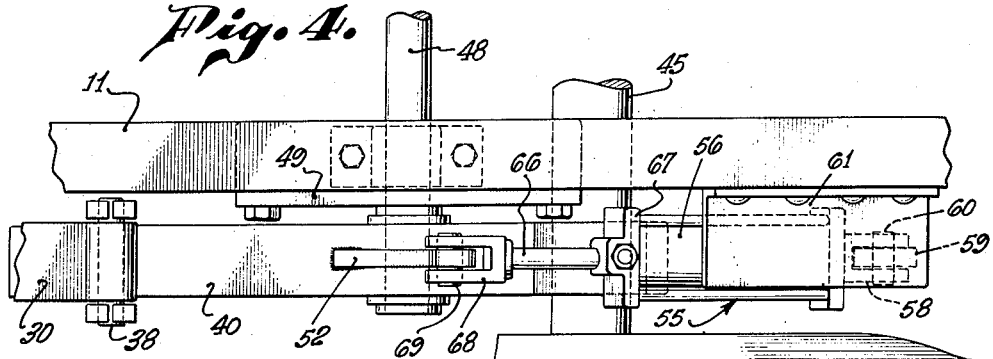
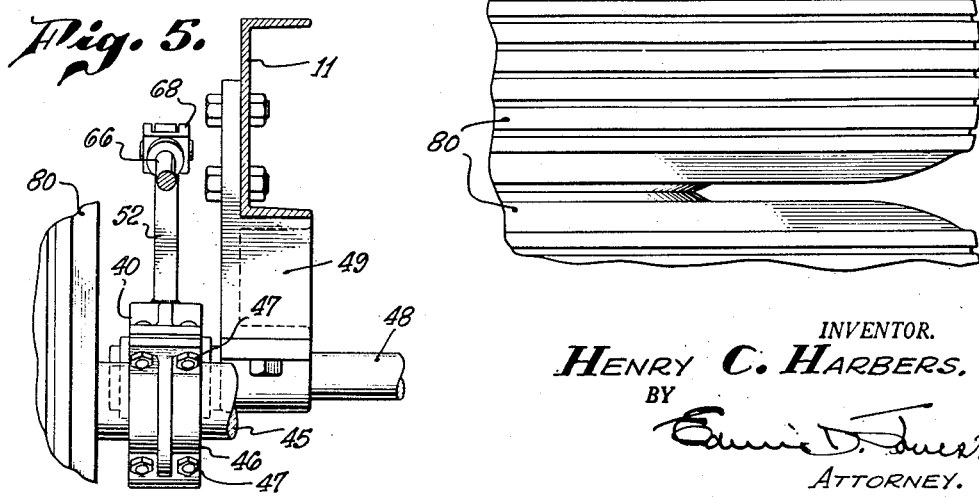

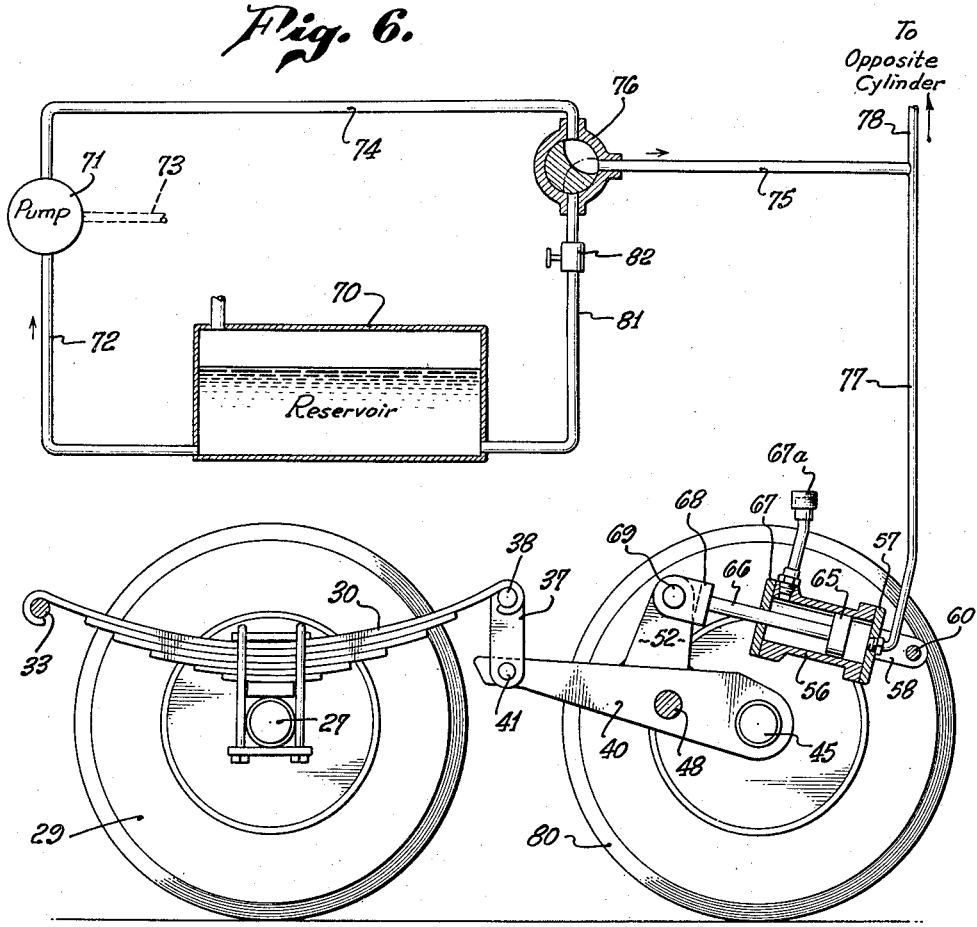
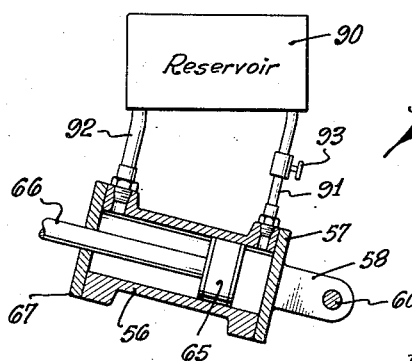

2,777,529

WEIGHT DISTRIBUTION AND TRACTION CONTROL MEANS FOR THREE-AXLE VEHICLES

Henry C. Harbers, Pasadena, Calif., assignor to Cook Bros. Equipment Co., Los Angeles, Calif., a corporation of California Application July 29, 1953, Serial No. 371,049

3 Claims. (Cl. 180—22)

This invention relates generally to vehicles and relates more particularly to weight distribution and traction control means for vehicles, such as, for example, third axle trucks.

While the present invention has particular utility in connection with the two point suspension type of third axle installation and is shown and described herein embodied in such an installation, it is to be understood that its utility is not confined thereto. It may, for example, be embodied in third axle installations of the one point suspension type and the three point suspension type.

An inherent characteristic found in certain of the third axle type of units is that in forward movement of the vehicle the driving force, or torque, as applied to the driving wheels by the engine, causes a shift in the distribution of the load between the two rear axles, that is, from one axle to the other, and the greater the torque applied to the driving axle the greater the shift or transfer of the weight. When the vehicle is operated in reverse the weight shift or transfer is the reverse from that occurring when the vehicle moves forwardly. Such shifts or transfers in the load distribution can result in very poor performance under certain conditions such as off-the-highway service.

Another difficulty that may occur in the third axle type of vehicle results from the braking action. That is, application of the brakes when the vehicle is moving also causes a shift in the load distribution between the rear axles and there is a tendency to cause one or the other of said rear axles to leave the ground, resulting in hopping or chattering.

It is therefore an object of the present invention to provide means for overcoming the above difficulties and undesirable characteristics of vehicles of the above described type.

Another object of the invention is to provide means for controlling the load or weight distribution of the vehicle between the driving axle and the third axle.

Still another object of the invention is to provide means of this character wherewith proper traction of the wheels of the driving axle is effected under various operating conditions.

A further object of the invention is to provide means of this character whereby the load may be shifted and the traction of the drive wheels controlled at the will of the operator or other occupant of the vehicle.

Another object of the invention is to provide means whereby the rate at which the load is shifted between the driving axle and the third axle may be controlled.

The characteristics and advantages of the invention are further elaborated on in the following detailed description of the accompanying drawings which represent certain embodiments of the invention. After considering these examples, skilled persons will understand that many variations may be made without departing from the principles disclosed; and the employement of any structures, arrangements, or modes of operation that are properly within the scope of the appended claims is contemplated.

Referring to the drawings, which are for illustrative purposes only:

Fig. 1 is a diagrammatic plan view of the chassis of a third axle type of vehicle, in which mechanism embodying the present invention is incorporated;

Fig. 2 is a sectional view taken on line 2—2 of Fig. 1;

Fig. 3 is an enlarged side view of the mechanism of the present invention which acts on the third axle and its associated wheels to control the weight or load distribution between the third axle and the driving axle;

Fig. 4 is an enlarged plan view of the same;

Fig. 5 is a view taken on line 5—5 of Fig. 3;

Fig. 6 is a diagrammatic view showing the mechanism for hydraulically controlling the third axle and its associated wheels, for controlling the load distribution between the third axle and the driving axle; and Fig. 7 is an alternative arrangement for controlling the load distribution.

Referring more particularly to the drawing, there is shown (Fig. 1) the chassis of a motor vehicle or truck having a frame, indicated generally at 10, which includes side members 11 extending longitudinally of the vehicle. There are also the usual cross members, indicated by the reference numerals 13, 14, 15 and 16. The vehicle has a cab 18 at the front end of the frame, with a hood 19 beneath which is located the engine, not shown, and fenders 20 are provided for the front wheels.

The differential and driving axle housing is indicated generally at 21, the differential 22 being connected to the engine in the usual manner by means which includes the propeller shaft 23, universal joint 24, and drive shaft 25. The driving axle shafts 27 extend outwardly of the differential gear system in the housing portion 22, said axle shafts being operably disposed within the portions 28 of the housing 21 and having the usual connection with the respective driving wheels 29. The outer ends of portions 28 are connected to the central portions of springs 30 by means of the usual bolts 31.

The forward or front ends of springs 30 are operably secured to fixed pivots 33 attached to plates 34 which are secured to the adjacent longitudinal frame members 11 by rivets 35 or other suitable means. The rear ends of said springs 30 are pivotally connected to the upper ends of respective links 37 by means of pivots 38. The lower ends of said links 37 are pivotally connected to rocker arms 40 adjacent the front ends thereof by means of pivots 41 which are received in one of three holes 42 provided therefor. By variously positioning the pivots 41 in the holes 42 the static weight distribution may be altered to suit various operating conditions, this arrangement being known.

The third axle or dolly axle 45, positioned rearwardly of the driving axle, is secured adjacent the respective ends thereof by suitable clamping means each of which includes a clamping member 46 attached at the rear end of its respective rocker arm 40 by bolts 47. The rocker arms 40 have fixed pivots intermediate their ends, being pivoted on adjacent ends of the trunnion shaft 48 carried by plates 49 secured to adjacent frame members 11 by bolts 50. A torque spring 51 is also shown between said trunnion shaft and the third axle.

Means for controlling the weight distribution and hence the traction of the driving wheels is provided. This means is shown in Figs. 1 to 6 as comprising hydraulic mechanism connected to arms 52 of the rocker arms 40 as will be described in greater detail hereinafter.

The hydraulic means includes a pressure applying actuator, indicated generally at 55, at each side of the frame. Each actuator comprises a cylinder 56 closed at its rear end by a member 57 from which a yoke 58 extends rearwardly. Between the side members of the yoke 58 is operably received an ear 59 which is rotatably secured to said yoke by a pivot pin 60. The ear a is a fixed member, being formed integrally with a plate 61 secured to the adjacent longitudinal frame member by bolts 62, the cylinder 56 pivoting, as required, on pin 60 under operating conditions.

A piston 65 is operably disposed within the cylinder 56 and is attached to a connecting rod 66 which extends outwardly of the cylinder at the end opposite the member 57, there being a head member 67 closing said opposite end of the cylinder. Member 67 is provided with an opening through which the piston rod 66 extends and the forward end of the cylinder is vented to atmosphere by means of a filtered air vent 67a. The outer end of rod 66 carries a yoke 68 between the arms of which the outer free end of arm 52 is operably received, the latter being connected with the yoke 68 by a pivot pin 69 so that said arm 52 and yoke 68 are pivotally connected together.

The hydraulic system also includes a reservoir 70 (Fig. 6) containing hydraulic fluid of any suitable well known type. Fluid from reservoir 70 is supplied to a pump 71 by means of a conduit 72, said pump being driven by any suitable power means, such as a power take-off 73 from the vehicle engine (not shown). The connecting means for providing hydraulic pressure to the pistons 65 includes a main conduit, comprising pipes 74 and 75 and a three way control valve 76 interposed between said pipes 74 and 75. Conduits 77 and 78 branch from pipe 75 and said conduits 77 and 78 are connected to the respective cylinders 56 at the rear ends thereof so that hydraulic pressure may be applied behind the respective pistons 65 to urge same to the left as shown in Figs. 2, 3 and 6. This pressure on the pistons is applied to the arms 52 of the rocker arms 40 in a direction tending to rotate said rocker arms in a direction tending to raise the third axle and move same toward the frame. This results in a shifting of the load so that the driving axle and its wheels 29 are carrying a greater than their normal percentage of the load, and even though the wheels 80 of the third axle are not actually raised from the surface on which the truck is operating the shift in the load effected by the hydraulic pressure behind the pistons 65 effects an increase in the traction of the driving wheels.

The three way control valve 76 is also connected with the reservoir by means of a conduit 81 in which is interposed a metering valve 82 providing a restrictive orifice which limits the flow of fluid therethrough. Control valve 76 has two operative positions. When said valve 76 is actuated to one of said operative positions hydraulic fluid pressure is transferred rapidly through the main and branch conduits to the rear of the hydraulic cylinders 56 so that said pressure is applied to the rear of the pistons 65 to urge the third axle wheels in an upward direction. Actuation of the valve 76 to its other operative positions cuts off the pump from the cylinders 56 and connects said cylinders with the reservoir 70 by way of conduit 81 with its restrictive orifice or valve 82. The hydraulic pressure in the cylinders 56 is therefore relieved at a limited rate and a cushioning effect is provided to the transfer or shift of the load toward the third axle to provide the normal load or weight distribution between said axle and the driving axle.

The valve 76 may be directly controlled manually or by any suitable remote control means and the operator may thereby control the load distribution and shift same between the driving axle and the third axle as conditions require.

An alternative means for controlling the load distribution is shown in Fig. 7 and functions as a snubber, there being a snubber at each side of the third axle. In this arrangement the rear end of the cylinder 56 is not supplied with hydraulic pressure but the rear and front ends of said cylinder are connected to a small reservoir 90 by means of conduits 91 and 92 respectively. The conduit 92 permits a substantially free flow of fluid between the front end of the cylinder 56 and the reservoir but the conduit 91 has a restricted orifice or adjustable metering valve 93 therein which limits the rate of flow of fluid between the rear of the cylinder 56 and the reservoir 90.

Thus the piston 65 will tend to move rearwardly less rapidly than forwardly as the fluid behind the piston must be forced through the metering valve 93, and as the piston rod 66 is connected to the arm 52 the shifting of the load from the third axle toward the driving axle by the driving torque when the vehicle starts or accelerates in a forward direction, is prevented or minimized. Conversely, the piston 65 will tend to move forwardly at a faster rate than rearwardly as there is no restriction in the conduit 92 and the piston 65 may move forwardly without working against and restricting fluid flow, but, nevertheless, its movement is sufficiently retarded by the fluid being drawn through the valve 93 to minimize transfer of the load from the driving axle to the third axle resultant of brake torque when the vehicle is moving forwardly.

From the foregoing it will be apparent that the present invention provides means for snubbing one of the rear axles or the other so as to limit the rate of load shift between the axles, and that there is also provided means under manual control for controlling the shifting of the load from one axle to the other. While the two forms of my invention have been illustrated and described in connection with a two-point suspension for the axles, it is to be understood that they are usable with the single and three-point suspensions, and equally effective to control the load or weight distribution of the vehicle between the driving axle and the third axle.

I claim:

1. In a vehicle: a frame; means for operably supporting said frame, said means including a driving axle, a third axle, and means operably interconnecting said axles for cooperative carrying of the load which has a normal static weight distribution between the axles; and hydraulic means for resisting the tendency of said load distribution to shift under certain operating conditions, said hydraulic means comprising a snubber device for each side of the vehicle, each of said snubber devices having a hydraulic cylinder; a piston operably received therein; means, including a piston rod, connecting said piston with the means operably interconnecting said axles forwardly of and adjacent to the connection of the last-mentioned means to said third axle so that said piston moves in the cylinder with movement of the third axle toward and away from said frame; a reservoir for hydraulic fluid; means freely connecting one end of the cylinder with said reservoir; and means restrictably connecting the other end of said cylinder with said reservoir, said cylinder, reservoir and connections therebetween comprising a closed hydraulic system.

2. In a vehicle having a frame, a driving axle and driving wheels thereon, and a third axle and wheels thereon; a leaf spring for each end of said driving axle, said driving axle being attached to the respective springs adjacent the centers thereof; fixed pivot means for the front end of each spring pivotally securing said spring ends to said frame; a rocker arm for each end of the third axle; means providing a fixed pivot intermediate the ends of each rocker arm, said fixed pivot means being secured to the frame of said vehicle; means securing the end portions of the third axle to the rear ends respectively of said rocker arms; link means operably connecting the front ends of said rocker arms to the rear ends of the respective springs; an arm extending laterally of each rocker arm between the pivot thereof and the front end of said rocker arm; a hydraulic snubber for each rocker arm, each snubber comprising a cylinder pivoted adjacent the rear end to said frame; a piston for each cylinder, said pistons being connected to respective lateral arms of said rocker arms; a fluid reservoir; means connecting each end of said cylinder to said reservoir; and means providing a restriction in one of the connections for each cylinder.

3. In a vehicle: a frame; means for operably supporting said frame, said means including a driving axle, a third axle, and means operably interconnecting said axles for cooperative carrying of the load which has a normal static weight distribution between said axles; hydraulic means for resisting the tendency of said load distribution to shift, said hydraulic means comprising a snubber device for each side of the vehicle, each of said snubber devices having a hydraulic cylinder; a piston operably received therein; means, including a piston rod, connecting said piston with the means operatively interconnecting said axles forwardly of and adjacent to the connection of the last-mentioned means to said third axle so that said piston moves in the cylinder with movement of the third axle toward and away from said frame; a reservoir for hydraulic fluid; means freely connecting one end of the cylinder with said reservoir; and means restrictively connecting the other end of said cylinder with said reservoir so that while the piston may move relatively fast and easily in one direction, its movement in the opposite direction is restrained for resisting the tendency of the third axle to shift relative to the frame under the influence of driving torque, said cylinder, reservoir and connections therebetween comprising a closed hydraulic system.

References Cited in the file of this patent

UNITED STATES PATENTS

| | | |
|---|---|---|
| 1,394,245 | Berry | Oct. 18, 1921 |
| 1,940,914 | Marcum | Dec. 26, 1933 |
| 1,953,751 | Samuelson et al. | Apr. 3, 1934 |
| 1,981,593 | Fageol | Nov. 20, 1934 |
| 1,989,745 | Farris | Feb. 5, 1935 |
| 2,087,255 | Hickman | July 20, 1937 |
| 2,096,530 | Alden | Oct. 19, 1937 |
| 2,261,438 | Harwood | Nov. 4, 1941 |
| 2,343,301 | Knox | Mar. 7, 1944 |
| 2,391,948 | Couse | Jan. 1, 1946 |
| 2,599,043 | Bissell | June 3, 1952 |
| 2,643,895 | Stover | June 30, 1953 |
| 2,659,446 | Willock | Nov. 17, 1953 |

FOREIGN PATENTS

| | | |
|---|---|---|
| 138,546 | Australia | Sept. 1, 1950 |
| 483,386 | Germany | Sept. 28, 1929 |
| 115,197 | Sweden | Oct. 16, 1945 |